United States Patent
Koo et al.

(10) Patent No.: US 7,979,143 B2
(45) Date of Patent: Jul. 12, 2011

(54) APPARATUS AND METHOD FOR PROPORTIONAL-INTEGRAL-DERIVATIVE CONTROL

(75) Inventors: Jun-Mo Koo, Suwon-si (KR); Jin-Young Choi, Seoul (KR); Dong-Hoon Jang, Suwon-si (KR); Byung-Kwon Kang, Suwon-si (KR); Pyo-Jae Kim, Seoul (KR); Dong-Sung Song, Seoul (KR); Hyung-Jin Jang, Seoul (KR)

(73) Assignees: Samsung Electronics Co., Ltd., Maetan-Dong, Yeongtong-Gu, Suwon-Si, Gyeonggi-Do (KR); Seoul National University Industry Foundation, Bongcheon-Dong, Gwanak-Gu, Seoul (KR)

( * ) Notice: Subject to any disclaimer, the term of this patent is extended or adjusted under 35 U.S.C. 154(b) by 787 days.

(21) Appl. No.: 11/954,301

(22) Filed: Dec. 12, 2007

(65) Prior Publication Data

US 2008/0195236 A1 Aug. 14, 2008

(30) Foreign Application Priority Data

Feb. 9, 2007 (KR) .................. 10-2007-0014009

(51) Int. Cl.
*G05B 13/02* (2006.01)
*G05B 21/02* (2006.01)
(52) U.S. Cl. ............... 700/42; 700/73; 700/74; 700/37; 700/50
(58) Field of Classification Search .............. 700/41, 700/42, 73, 74, 37, 50; 706/900, 903; 318/561, 318/609, 610
See application file for complete search history.

(56) References Cited

U.S. PATENT DOCUMENTS

| 4,466,054 A | * | 8/1984 | Shigemasa et al. | 700/42 |
| 5,295,061 A | * | 3/1994 | Katayama et al. | 700/37 |
| 6,064,920 A | | 5/2000 | Monleone | 700/170 |
| 2006/0036336 A1 | * | 2/2006 | Chandhoke | 700/42 |

FOREIGN PATENT DOCUMENTS

| KR | 10-072696 | 4/1994 |
| KR | 1995-10323 | 4/1995 |
| KR | 1999-74911 | 10/1999 |
| KR | 2000-51941 | 8/2000 |

(Continued)

OTHER PUBLICATIONS

Lopez et al. "Some Pratical Aspects about Performance and Tuning of a Multirate Discrete PID Controller" 2007 Mediterranean Conference on Control and Automation, Jul. 27-29, 2007 Athens Greece pp. 1-6.*

(Continued)

*Primary Examiner* — Albert Decady
*Assistant Examiner* — Steven R Garland
(74) *Attorney, Agent, or Firm* — Cha & Reiter, LLC (57) ABSTRACT

A PID controlling apparatus and method for providing a control value to a control object according to the difference between an output value of the control object and a target value are provided, in which an error calculator outputs an error value between the target value and the output value of the control object, a PID operator calculates a proportional value, an integral value, and a derivative value of the error value, calculates the control value using the proportional value, the integral value, and the derivative value, and outputs the control value to the control object, a first sampler samples the output value of the control object a plurality of times with respect to the target value and outputs a sampled output value, and a controller controls the PID operator to repeat a PID operation and output the control value according to a sampling period of the first sampler.

18 Claims, 6 Drawing Sheets

FOREIGN PATENT DOCUMENTS

KR    2006-6315    1/2006

OTHER PUBLICATIONS

Salt, Julian, et al.; "Multirate Controllers Design by Rate Decomposition;" Decision & Control 2000, Proceedings of the 39$^{th}$ IEEE Conference on Dec. 12-15, 2000, vol. 5, Piscataway, NJ; Jan. 1, 2001; XP010537228.

Liu, Jun, et al.; "Implementation of a High Performance Multirate Control System Using PC;".

* cited by examiner

APPARATUS AND METHOD FOR PROPORTIONAL-INTEGRAL-DERIVATIVE CONTROL

CLAIM OF PRIORITY

This application claims the benefit of the earlier filing date, under 35 U.S.C. §119(a) to that patent application filed in the Korean Intellectual Property Office on Feb. 9, 2007 and assigned Serial No. 2007-14009, the entire disclosure of which is hereby incorporated by reference.

BACKGROUND OF THE INVENTION

1. Field of the Invention

The present invention relates to a feedback control apparatus. More particularly, the present invention relates to a Proportional-integral-Derivative (PID) controller for controlling a control value based on the output value of a control object to be controlled.

2. Description of the Related Art

A portable electronic device with a camera module is equipped with a hand-trembling compensation apparatus. The hand-trembling compensation apparatus typically includes a Voice Coil Motor (VCM), a driver using a piezoelectric actuator, and a feedback controller for controlling the driver based on the output value of the driver.

The driver has hysteresis according to non-linear, time-varying driving direction. Generally, the driver is controllable in a very narrow range and has a rapid phase variation in a control range, and its operational characteristics vary with a change in an operational environment such as temperature.

Conventionally, the non-linear driver is controlled through an approximation to a linear function using a PID controller or a lead-lag controller or by a non-linear system control algorithm taking a large computation volume, such as neural network control or fuzzy control. The use of linear control technology is not effective in sufficiently compensating for the non-linearity. For example, a driver that moves an image sensor on a driving surface by means of a VCM may experience a drag phenomenon as the driving range becomes narrower with respect to the same driving command due to friction on the driving surface. Although the drag can be resolved by applying a regular high-frequency vibration signal to the driver, the resulting increased noise and power consumption makes this method unsuitable for portable electronic devices. The use of non-linear control technology, such as neural network control or fuzzy control requires a large amount of computation. Hence, this approach does not achieve a sufficient control performance when a low-spec microcontroller suitable for a small-size electronic device is used.

PID control is the most widespread control method due to its simple control mechanism and easy implementation. Despite the advantage of satisfactory control performance for a linear system, a general PID controller has limited performance because a real system has complex characteristics including non-linearity and time variability. An adaptive control scheme like self-tuning PID control has been proposed to solve this problem. However, the adaptive control scheme is based on the linearity of a driver and requires strict operational conditions. The fundamental cause of the problem is that a complex system is controlled based on a mathematic model.

A fuzzy control scheme has complex system characteristics including non-linearity and time variability. That's why fuzzy control is used for system control that does not allow for mathematical modeling. A fuzzy controller does not require mathematical modeling and provides control by language rules, e.g., "IF-THEN", adaptively according to instantaneous system situations. Therefore, the fuzzy control scheme is popular and flexible in dealing with non-linear control issues. A typical fuzzy controller forms control rules by receiving an error and its derivative as inputs. This input mechanism is similar to that of the PID controller, However, compared to the PIP controller, the fuzzy controller is complex to implement and takes a large amount of computation, and the control rules are difficult to design.

As described above, the conventional PID control or fuzzy control requires an accurate mathematic model or has the shortcomings of a large computation volume and implementation complexity. Therefore, it is not suitable for fast and high-precision control using a low-performance microcontroller.

Accordingly, there exists a need for a feedback controller that can provide for fast control of a non-linear driver in real time with high precision by means of a small-sized circuit structure using a low-spec microprocessor.

SUMMARY OF THE INVENTION

An aspect of exemplary embodiments of the present invention is to provide a PID controller for real-time control of a non-linear driver with high precision by means of a small-sized circuit structure using a low-spec microprocessor.

In accordance with an aspect of the present invention, there is provided a PID controller for providing a control value to a control object to be controlled according to the difference between an output value of the control object and a target value, in which an error calculator outputs an error value between the target value and the output value of the control object, a PID operator calculates a proportional value of the error value, calculates an integral value of the error value by integration, calculates a derivative value of the error value by differentiation, calculates the control value using the proportional value, the integral value, and the derivative value, and outputs the control value to the control object, a first sampler samples the output value of the control object a plurality of times with respect to the target value and outputs a sampled output value, and a controller controls the PID operator to perform a PIP operation a plurality of times and output the control value according to a sampling period of the first sampler,

BRIEF DESCRIPTION OF THE DRAWINGS

The above features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The matters presented in the description such as a detailed construction and elements are provided to assist in an understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
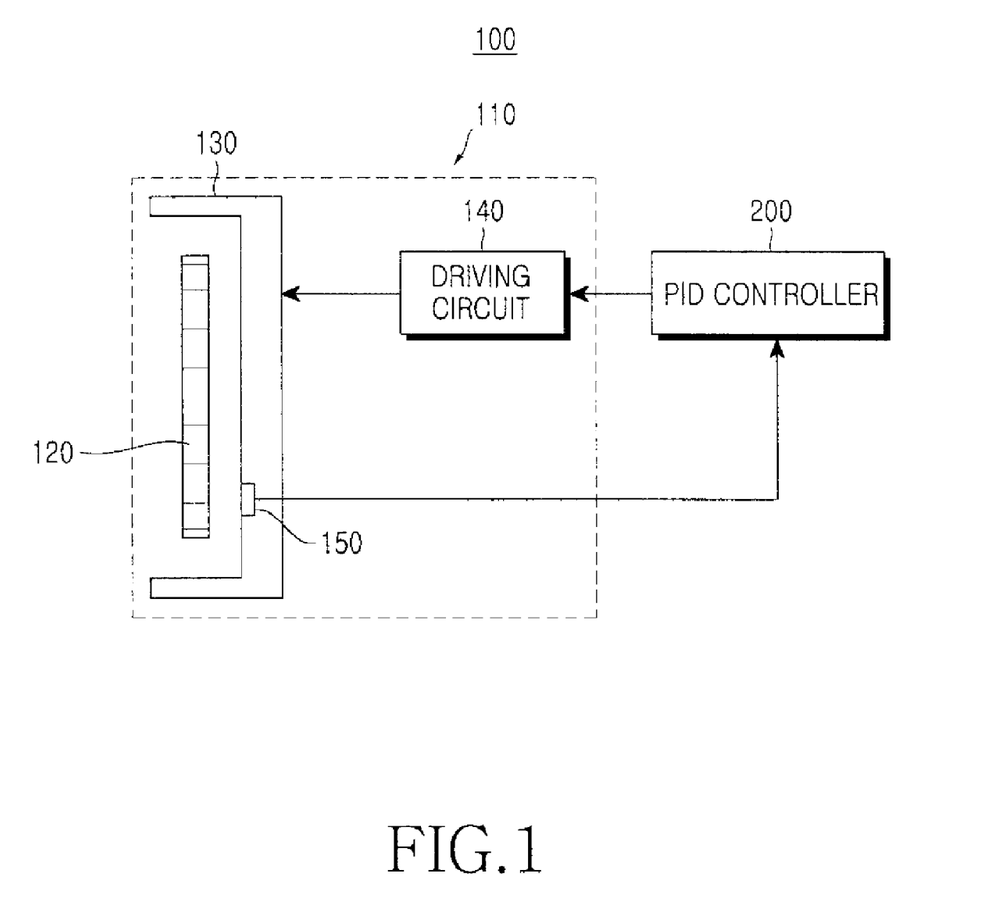
FIG. 1 is a block diagram of a driving system according to an exemplary embodiment of the present invention.

FIG. 1 is a block diagram of a driving system according to an exemplary embodiment of the present invention. Referring to FIG. 1, a driving system 100 includes a control object 110 to be controlled and a multi-rate PID controller 200. The control object 110 has a moving object 120 such as an image sensor, a driver 130 using a VCM or the like, and a driving circuit 140. For example, the driver 130 can be configured so as to move the image sensor on a driving surface using the VCM or the like.

The driving circuit 140 outputs a driving signal for driving the driver 130 under the control of the multi-rate PID controller 200 and the driver 130 moves the moving object 120 according to the driving signal. The driver 130 is provided with a position sensor 150 for sensing the location of the moving object 120 and the position sensor 150 outputs a position value of the moving object 120 to the multi-rate PID controller 200. The multi-rate PID controller 200 calculates a control value based on the difference between the position value and a target value and provides the control value to the driving circuit 140.

Figure 2:
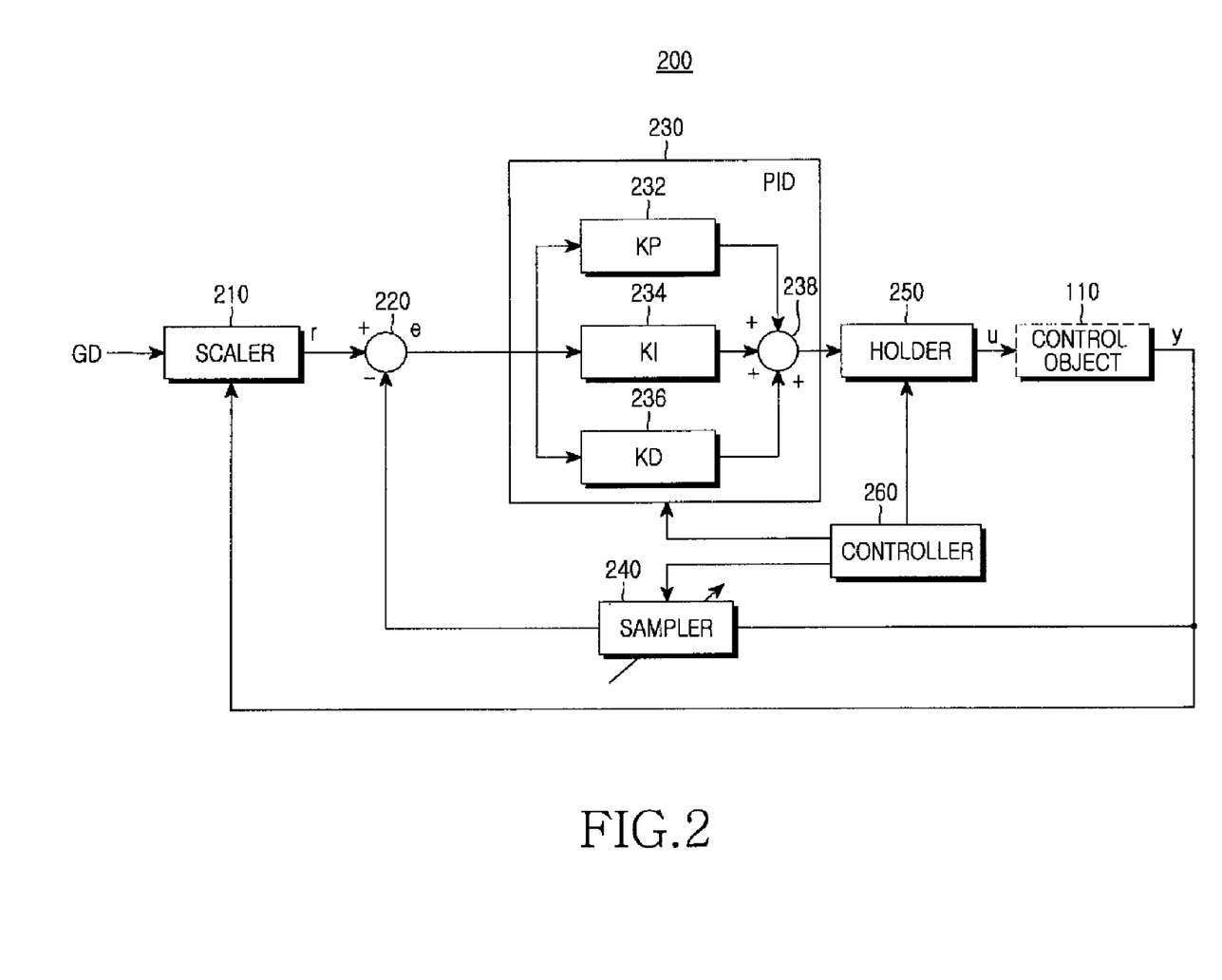
FIG. 2 is a detailed block diagram of the multi-rate PID controller illustrated in FIG. 1.

FIG. 2 is a detailed block diagram of the multi-rate PID controller 200. Referring to FIG. 2, the multi-rate PID controller 200 includes a scaler 210, an error calculator 220, a PID operator 230, a sampler 240, a holder 250, and a controller 260.

The scaler 210 receives a program value GD from the controller 260 and changes a target value r according to a target value change period. The controller 260 provides the program value GD to the scaler 210 and the target value r is changed every predetermined period. The change includes keeping a current target value. The target value change period can be equal to a position value output period of the control object 110. In this case, the scaler 210 can change the target value r in the same period as a position value input period from the control object 110. For example, the program value GI) can be a position value by which to move the image sensor to a changed focal position in order to compensate for a hand trembling-caused focal position change.

The sampler 240 samples a position value y received from the control object 110 every predetermined period. The sampling period is equal to an output period of the PID operator 230. This period is fixed to a predetermined value or set by the controller 260.

The error calculator 220 receives the target value r from the scaler 210 and the sampled position value y from the sampler 240 and calculates an error value e between the position value y and the target value r.

The PID operator 230 calculates a control value u using the error value e received from the error calculator 220. The PID operator 230 includes a proportional calculator 232, an integrator 234, a differentiator 236, and a summer 238. The proportional calculator 232 calculates a proportional value of the error value e, the integrator 234 calculates an integral value of the error value e, and the differentiator 236 calculates a derivative value of the error value e. The summer 238 sums the proportional value, the integral value, and the derivative value and provides the resulting control value u to the holder 250.

That is, the PID operator 230 generates the control value u by appropriately weighting the error value e, its integral value (i.e. the past history component of the error value e), and its derivative value (i.e. the future change component of the error value e). The creation of the control value u is expressed as $$u(t) = K_P e(t) + K_I \int_0^t e(t)dt + K_D \frac{de(t)}{dt} \quad (1)$$

where $K_p$ denotes a proportional coefficient,
e(t) denotes the error value,
$K_I$ denotes an integral coefficient,
$K_D$ denotes a derivative coefficient.

The proportional coefficient ($K_p$), the integral coefficient ($K_I$), and the derivative coefficient ($K_D$) are determined according to the operational characteristics of the driver 130.

The PID operator 230 outputs the control value u by performing the PID operation every predetermined period. The PID operation period can be fixed to a predetermined value or set by the controller 260. An output period of the PID operator 230 is equal to the sampling period of the sampler 240 with an operation period shorter than the target value change period of the scaler 210. Preferably but not necessarily, the output period of the PID operator 230 is shorter than the target change period of the scaler 210 by a factor of N, wherein. N is a natural number of 2 or above.

The holder 250 regularly outputs the control value u received from the PID operator 230 to the control object 110 during the PID operation period. A holding period of the holder 250 is fixed to a predetermined value or set by the controller 260. The holding period can be set to be equal to the output period of the PDI operator 230.

Figure 3A:
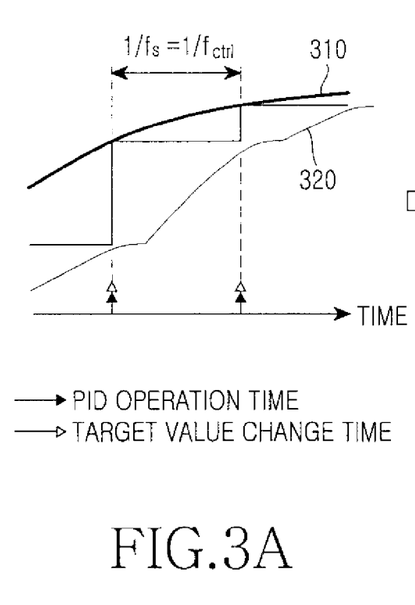
FIGS. 3A and 3B compare the PID operator illustrated in FIG. 2 with a conventional PID operator in terms of operational characteristics.
Figure 3B:
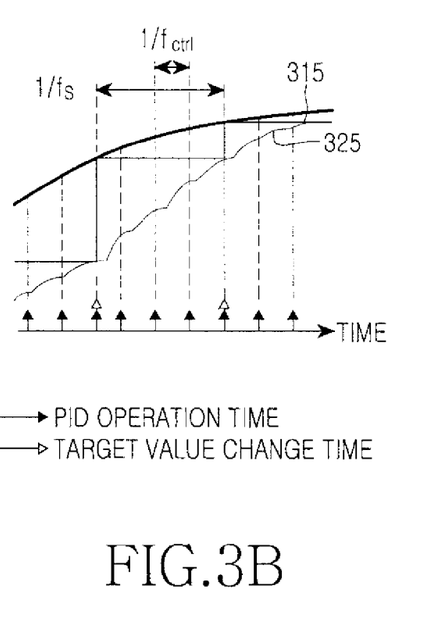

FIGS. 3A and 3B compare the PID operator 230 with a conventional PID operator in terms of operational characteristics. Specifically FIG. 3A illustrates operational characteristics of a conventional PID operator and FIG. 3B illustrates operational characteristics of the PID operator 230 according to the present invention.

Referring to FIG. 3A, a target value curve 310 and a position value curve 320 are shown. For the conventional PID operator, the target value is discretely changed every predetermined period and a PID operation period $f_{ctrl}$ is equal to a target change period $f_s$. As noted from FIG. 3A, a control value output from the conventional PID operator is set to a relatively large value so that a position value can increase significantly to the target value in a single step.

Referring to FIG. 3B, a target value curve 315 and a position value curve 325 are shown. For the PID operator 230, the target value is discretely changed (or generated) every predetermined period and the PID operation period $f_{ctrl}$ is four times shorter than the target change period $f_s$. As noted from FIG. 3B, a control value u output from the PID operator 230 is set to a relatively small value so that a position value y can increase to the target value stepwise over a plurality of times. The stepwise increase means that a continual increase and convergence of the position value y is iterated a plurality of times.

Accordingly, if the proportional coefficient of the conventional PID operator is 1, the PID operator 230 of the present invention can have a proportional coefficient of ½ or less, or preferably ¼ or less.

Control of the PID operator 230 in narrower control periods segmented from a conventional control period brings about the effect of approximation of the non-linearity of the driver 130 to linearity. Thus, the PID controller 230 can operate in the narrower linear periods more effectively. Also, as the proportional coefficient, the integral coefficient, and the derivative coefficient are set to values smaller than are done conventionally, the driving resolution of the control value u is increased, thereby relatively increasing a controllable period. As a consequence, the conventional problem of narrowing a controllable period due to non-linearity and hysteresis is solved. Further, the problem of a slight difference in the control period caused by a manufacture error of the driver can be overcome.

Figure 4:
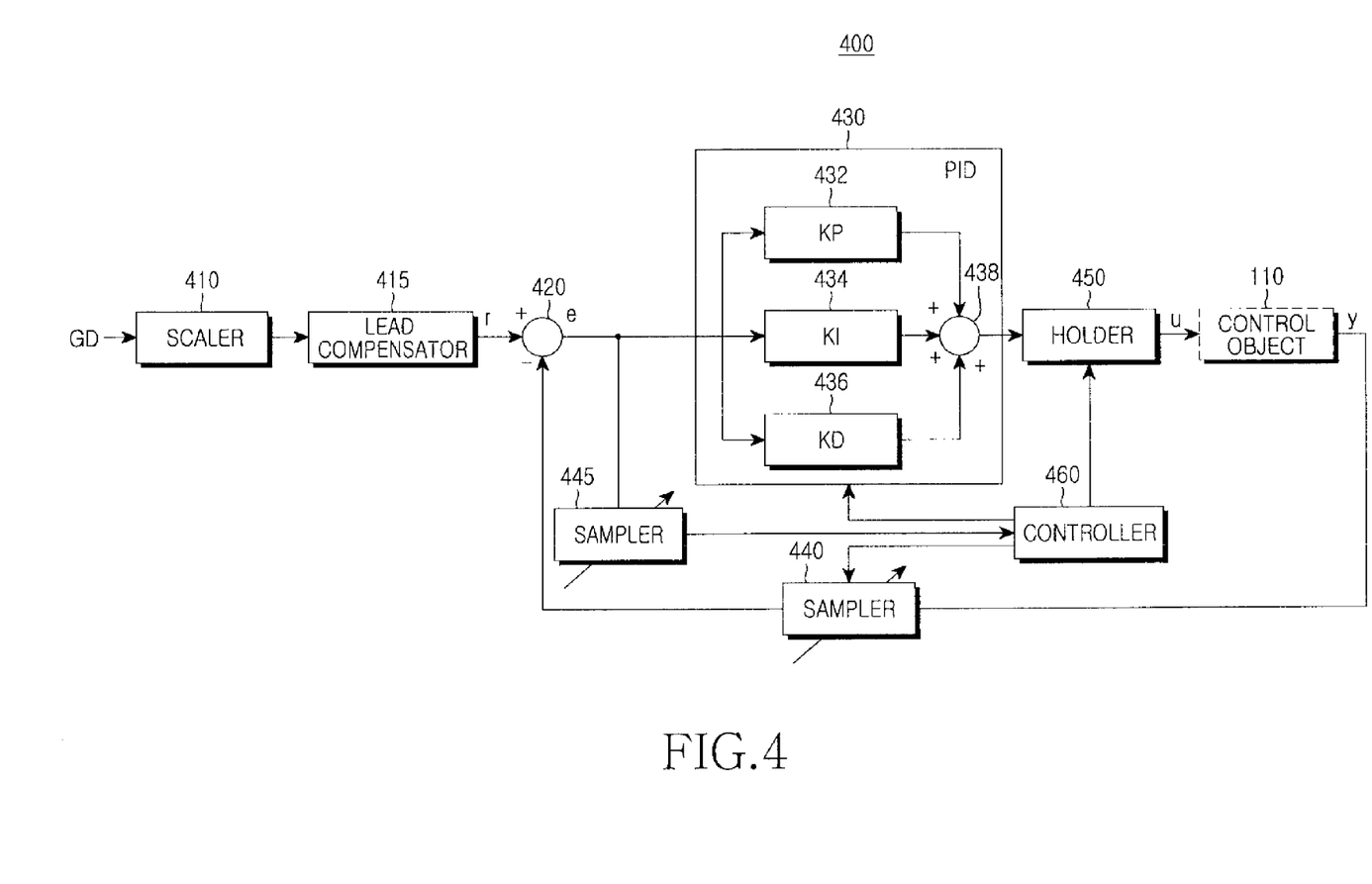
FIG. 4 is a block diagram of a multi-rate PID controller according to another exemplary embodiment of the present invention.

FIG. 4 is a detailed block diagram of a multi-rate PID controller according to another exemplary embodiment of the present invention. Referring to FIG. 4, a multi-rate PID controller 400 is applied to the driving system 100 illustrated in FIG. 1. The multi-rate PID controller 400 includes a scaler 410, a lead compensator 415, an error calculator 420, a PID operator 430, first and second samplers 440 and 445, a holder 450, and a controller 460.

The scaler 410 receives a program value GD from the controller 460 and changes a target value according to a target value change period. The controller 460 provides the program value GD to the scaler 410 and the target value r is changed every predetermined period. The change includes keeping a current target value. The target value change period can be equal to a position value output period of the control object 110. For example, the program value GD can be a position value by which to move the image sensor to a changed focal position in order to compensate for a hand trembling-caused focal position change.

The lead compensator 415 compensates the target value received from the scaler 410. For example, the lead compensator 415 can add a compensation value to the target value according to the position of the moving object 120 in order to compensate for the hysteresis of the driver 130. The hysteresis refers to the phenomenon that when the driver 130 reciprocates the moving object 120 between two different points, its operational characteristics change according to a moving direction. Hereinbelow, the target value is a compensated target value r.

The first sampler 440 samples a position value y received from the control object 110 in a first sampling period. The first sampling period is equal to an output period of the PID operator 430. This period is fixed to a predetermined value or set by the controller 460.

The error calculator 420 receives the target value r from the lead compensator 415 and the position value y from the first sampler 440 and calculates an error value e between the position value y and the target value r.

The second sampler 445 samples the error value e received from the error calculator 420 in a second sampling period. The second sampling period is equal to the first sampling period. This period is fixed to a predetermined value or set by the controller 460.

The controller 460 calculates a derivative value e' of the error value e received from the second sampler 445 and fuzzy-controls a proportional coefficient $K_p$ of the PID operator 460. For the fuzzy control, four rules are applied as follows.

Rule 1. If the error value e and its derivative value e' are large, the proportional coefficient $K_p$ is set to be large.

Rule 2. If the error value e is large and its derivative value e' is small, the proportional coefficient $K_p$ is set to be very large.

Rule 3. If the error value e is small and its derivative value e' is large, the proportional coefficient $K_p$ is set to be very small.

Rule 4. If the error value e and its derivative value e' are small, the proportional coefficient $K_p$ is set to be small.

In any of the rules, the changed proportional coefficient is larger than the original proportional coefficient, preferably by two or more times. According to a rule selected based on the error value e and its derivative value e', the controller 460 increases the proportional coefficient $K_p$ of the PID operator 460 in a first PID operation period after a target change time point and decreases it to its original value in the next PID operation period. For example, the controller 460 doubles the proportional coefficient $K_p$ of the PID operator 460 in the first PID operation period after the target value change time point and decreases the two-fold proportional coefficient $K_p$ to ½ or less to achieve the original set value in the next PID operation period.

The PID operator 430 calculates a control value u using the error value e received from the error calculator 420. The PID operator 430 includes a proportional calculator 432, an integrator 434, a differentiator 436, and a summer 438. The proportional calculator 432 calculates a proportional value of the error value e, the integrator 434 calculates an integral value of the error value e, and the differentiator 436 calculates a derivative value of the error value e. The summer 438 sums the proportional value, the integral value, and the derivative value and provides the resulting control value u to the holder 450.

The PID operator 430 outputs the control value u by performing the PID operation every predetermined period. The MD operation period can be fixed to a predetermined value or set by the controller 460. An output period of the PID operator 430 is equal to the first sampling period of the first sampler 440 with an operation period shorter than a target value generation period of the lead compensator 415, preferably but not necessarily, by N times, where N is a natural number of 2 or above.

The holder 450 outputs the control value u received from the PID operator 430 to the control object 110 every predetermined holding period. The holding period is fixed to a predetermined value or set by the controller 460. The holding period can be set to be equal to the output period of the PID operator 430.

Figure 5A:
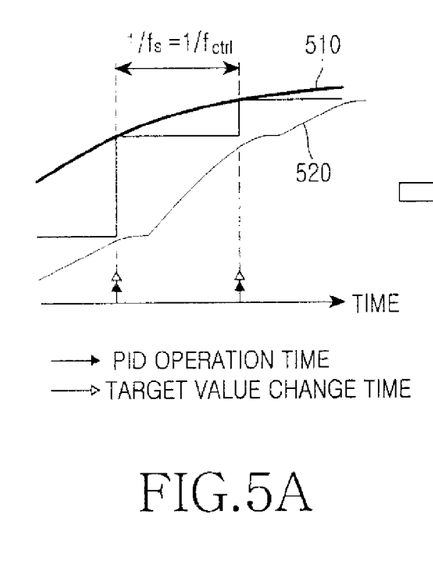
FIGS. 5A and 5B compare the PIP operator illustrated in FIG. 4 with a conventional PIP operator in terms of operational characteristics.
Figure 5B:
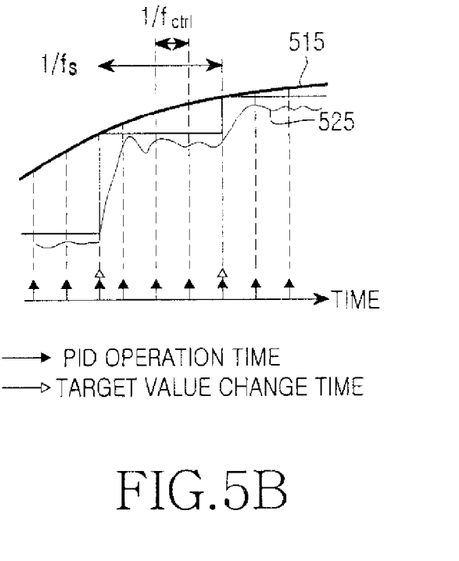

FIGS. 5A and 5B compare the PID operator 430 with a conventional PID operator in terms of operational characteristics. Specifically, FIG. 5A illustrates operational characteristics of a conventional PID operator and FIG. 5B illustrates operational characteristics of a PID operator 430 according to the present invention.

Referring to FIG. 5A, a target value curve 510 and a position value curve 520 are shown. For the conventional PID operator, the target value is discretely changed (or generated) every predetermined period and a PID operation period $f_{ctrl}$ is equal to a target change period $f_s$. As noted from FIG. 5A, a control value output from the conventional PID operator is set to a relatively large value so that a position value can continuously increase toward the target value at one time.

Referring to FIG. 5B, a target value curve 515 and a position value curve 525 are shown. For the PID operator 430, the target value is discretely changed (or generated) every predetermined period and the PID operation period $f_{ctrl}$ is four times shorter than the target change period $f_s$. As the proportional coefficient of the PID operator 430 increases from the proportional coefficient of a previous PID operation period in a first PID operation period after a target value change time point, the control value u also increases. As a result, the position value y increases above the target value.

In second to fourth PIP operation periods after the target value change time point, the proportional coefficient of the PID operator 430 decreases to the original value, In other words, the proportional coefficient is recovered to its original value. Therefore, the position value y gradually converges to the target value under multi-rate PID control.

For example, if the proportional coefficient of the conventional PID operator is 1, the PID operator 430 of the present invention can have a proportional coefficient of ½ or above, preferably a proportional coefficient of 1 in a first PDI operation period, and a proportional coefficient of ½ or less, preferably a proportional coefficient of ¼ or less in second to fourth PDI operation periods.

Because the PID operator 430 outputs a large control value in the first PDI operation period after the target value change time point, the time variability of the driver 130, i.e. a drag over time can be overcome. Also, as the driver 130 is moved in the vicinity of a target value, a fine position control is provided so that the driver 130 converges to the target value with a faster and higher-precision.

Figure 6:
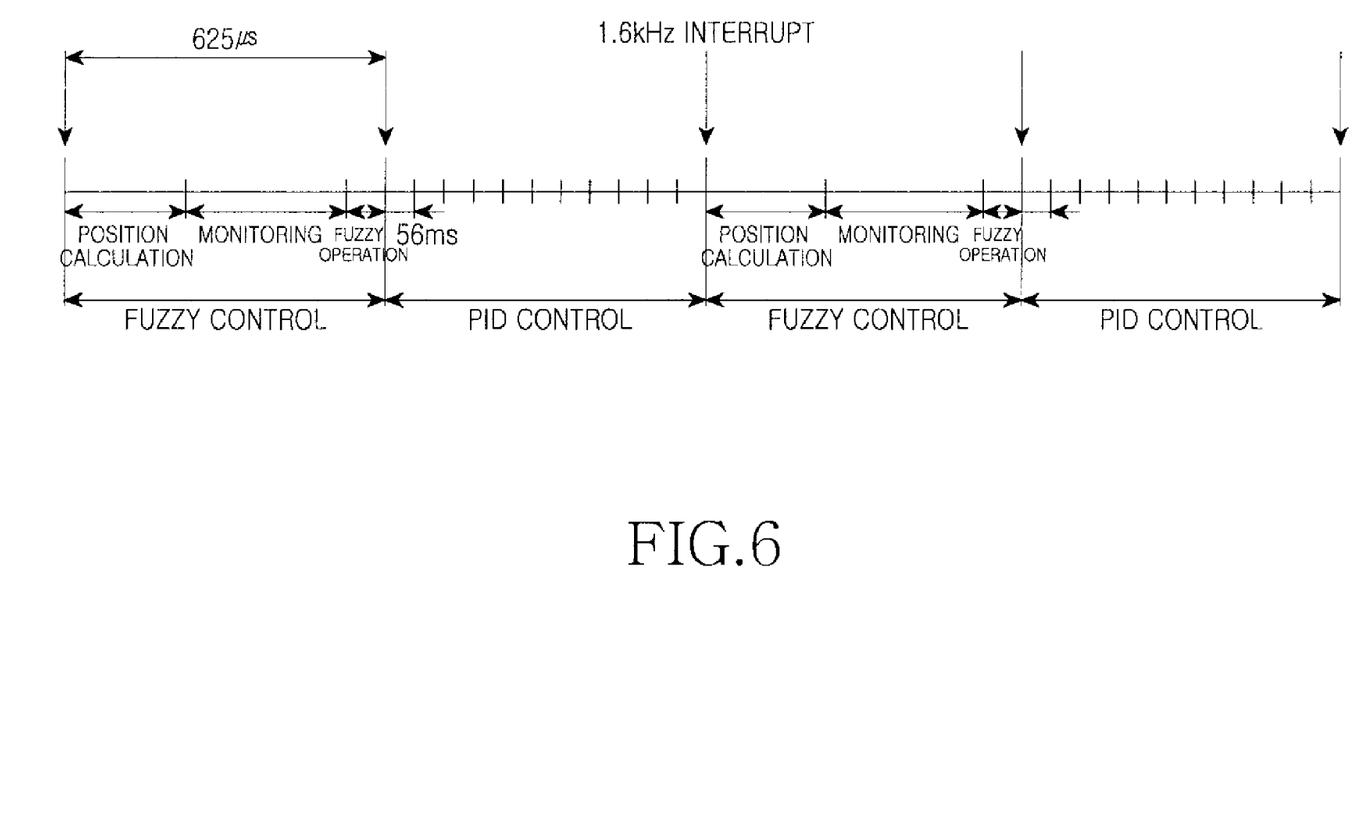
FIG. 6 is a diagram illustrating time scheduling of the controller illustrated in FIG. 4.

FIG. 6 is a diagram illustrating time scheduling of the controller 460. When a low-spec microcontroller is used for the controller 460, different controls cannot be provided simultaneously. That is, since the controller 460 cannot perform fuzzy control and PID control simultaneously and should generate the program value GD, it divides a time period into equal interrupt periods and performs fuzzy control in one interrupt period and multi-rate PID control in the next interrupt period. Basically, for time scheduling, the controller 460 defines a first interrupt period for fuzzy control of a target value r and a second interrupt period for multi-rate PID control of the target value r so that the first and second interrupt periods alternate each other periodically. 1the first interrupt period is further divided into a target position value (i.e. program value) calculation area, an area for monitoring signal input/output to/from peripheral devices, and a fuzzy operation area. The second interrupt period is dedicated to the multi-rate PID control. Another time scheduling method can also be contemplated, in which the controller 460 defines a first interrupt period for fuzzy control of an x-axis target value, a second interrupt period for multi-rate PID control of the x-axis target value, a third interrupt period for fuzzy control of an y-axis target value, and a fourth interrupt period for multi-rate PID control of the y-axis target value and the first to fourth interrupt periods are repeated periodically.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGIA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As described above, the PID controller of the present invention uses a multi-rate technology that sets a PID operation period shorter than a target value change period, thereby controlling a non-linear driver fast with high precision in real time by means of a small-size circuit structure using a low-spec microcontroller.

Also, the PID controller provides fuzzy control as well as multi-rate PID control, thereby controlling a non-linear driver with high precision in real time by means of a small-size circuit structure using a low-spec microcontroller.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A Proportional-Integral-Derivative (PID) controller for providing a control value to a control object to be controlled according to the difference between an output value of the control object and a target value, comprising:
   an error calculator for outputting an error value between the target value and the output value of the control object;
   a PID operator for calculating a proportional value of the error value, calculating an integral value of the error value by integration, calculating a derivative value of the error value by differentiation, calculating the control value using the proportional value, the integral value, and the derivative value, and outputting the control value to the control object;
   a first sampler for sampling the output value of the control object with respect to the target value and outputting a sampled output value to the error calculator; and
   a controller for controlling the PID operator to perform a PID operation a plurality of times and output the control value according to a sampling period of the first sampler, the controller configured to increase a proportional coefficient of the PID operator from a proportional coefficient of a previous PID operation period after a target value change time point and decreases the increased proportional coefficient in a next PID operation period.

2. The PID controller of claim 1, wherein a PID operation period of the PID operator is shorter than a target value change period by at least two times.

3. The PID controller of claim 1, further comprising:
   a second sampler for sampling the error value received from the error calculator with respect to the target value and outputting a sampled error value to the controller, the controller further configured to change the proportional coefficient of the PID operator based on the sampled error value received from the second sampler and a derivative value of the sampled error value.

4. The PID controller of claim 3, wherein the controller controls the PID operator so that the proportional coefficient becomes progressively higher in the order of:
   the case where the sampled error value is small and the derivative value of the sampled error value is large,
   the case where the sampled error value is small and the derivative value of the sampled error value is small,
   the case where the sampled error value is large and the derivative value of the sampled error value is large, and
   the case where the sampled error value is large and the derivative value of the sampled error value is small.

5. The PID controller of claim 1, wherein the control object moves a moving object under the control of the controller and outputs a position value of the moving object.

6. A Proportional-Integral-Derivative (PID) control method for providing a control value to a control object to be controlled according to the difference between an output value of the control object and a target value, comprising:
outputting an error value between the target value and the output value of the control object;
calculating a proportional value of the error value, calculating an integral value of the error value by integration, calculating a derivative value of the error value by differentiation, calculating the control value using the proportional value, the integral value, and the derivative value, and outputting the control value to the control object; and
repeating the proportional value calculation, the integration, the differentiation, and the control value calculation with respect to the target value,
increasing the proportional coefficient from a proportional coefficient of a previous PID operation period after a target value change time point and decreasing the increased proportional coefficient in a next PID operation period.

7. The PID control method of claim 6, further comprising:
sampling the output value of the control object a plurality of times with respect to the target value, wherein the step of repeating is performed according to a sampling period of the sampling.

8. The PID control method of claim 6, wherein a PID operation period of the proportional value calculation, the integration, the differentiation, and the control value calculation is shorter than a target value change period by at least two times.

9. The PID control method of claim 6, further comprising changing the proportional coefficient for the proportional value calculation based on the error value and a derivative value of the error value.

10. The PID control method of claim 9, wherein the proportional coefficient changing comprises:
setting the proportional coefficient to be progressively higher in the order of;
the case where the error value is small and the derivative value of the sampled error value is large,
the case where the error value is small and the derivative value of the error value is small,
the case where the error value is large and the derivative value of the sampled error value is large, and
the case where the sampled error value is large and the derivative value of the sampled error value is small.

11. A Proportional-Integral-Derivative (PID) controller for providing a control value to a control object to be controlled according to the difference between an output value of the control object and a target value, comprising:
a processor in communication with a memory, the memory containing code therein which when accessed by the processor causes the processor to execute the steps of:
receiving, from a first sampler, a sample of the output value of the control object with respect to the target value;
receiving an error value generated by an error calculator, said error value being a difference between the target value and the sampled output value of the control object;
calculating:
a proportional value of the error value;
an integral value of the error value by integration; and
a derivative value of the error value by differentiation; and
determining the control value using the proportional value, the integral value, and the derivative value, and outputting the control value to the control object; and
increasing a proportional coefficient of a previous proportional value calculation after a target value change time point and decreasing the increased proportional coefficient in a next proportional value calculation.

12. The controller of claim 11, wherein a PID operation period of the proportional value calculation, the integration, the differentiation, and the control value calculation is shorter than a target value change period by at least two times.

13. The controller of claim 11, wherein said processor further executes the steps of:
receiving a sample of the error value from a second sampler; and
changing the proportional coefficient of the proportional value calculation based on the sampled error value received from the second sampler and a derivative value of the sampled error value.

14. The controller of claim 13, wherein the proportional coefficient becomes progressively higher in the order of:
the case where the sampled error value is small and the derivative value of the sampled error value is large,
the case where the sampled error value is small and the derivative value of the sampled error value is small,
the case where the sampled error value is large and the derivative value of the sampled error value is large, and
the case where the sampled error value is large and the derivative value of the sampled error value is small.

15. The controller of claim 11, wherein the control object moves a moving object under the control of the controller and outputs a position value of the moving object.

16. The controller of claim 11, wherein said code is provided by a computer-readable medium.

17. The controller of claim 16, wherein said computer-readable medium is selected from the group of: magnetic medium, optical medium, and semiconductor medium.

18. The controller of claim 16, wherein said computer-readable medium is an electronic form memory.

* * * * *